(12) United States Patent
Al-Samadi

(10) Patent No.: US 6,416,668 B1
(45) Date of Patent: Jul. 9, 2002

(54) WATER TREATMENT PROCESS FOR MEMBRANES

(76) Inventor: Riad A. Al-Samadi, 891 Kingsway Drive, Burlington, Ontario (CA), L7T 3H8

( * ) Notice: Subject to any disclaimer, the term of this patent is extended or adjusted under 35 U.S.C. 154(b) by 0 days.

(21) Appl. No.: 09/653,691

(22) Filed: Sep. 1, 2000

Related U.S. Application Data

(60) Provisional application No. 60/151,925, filed on Sep. 1, 1999.

(51) Int. Cl.[7] .............................................. B01D 65/08
(52) U.S. Cl. ...................... 210/636; 210/639; 210/641; 210/651; 210/721; 210/722; 210/724; 210/760; 210/806
(58) Field of Search ................................ 210/241, 259, 210/638, 639, 641, 650, 651, 652, 653, 702, 712, 721, 722, 723, 724, 800, 802, 804, 805, 806, 748, 636, 696, 725–728, 758, 759, 760, 764

(56) References Cited

U.S. PATENT DOCUMENTS

| | | | | |
|---|---|---|---|---|
| 5,174,901 A | * | 12/1992 | Smith ......................... | 210/652 |
| 5,190,659 A | * | 3/1993 | Wang et al. ................. | 210/259 |
| 5,240,600 A | * | 8/1993 | Wang et al. ................. | 210/259 |
| 5,460,723 A | * | 10/1995 | Bourbigot et al. .......... | 210/639 |
| 5,501,798 A | * | 3/1996 | Al-Samadi et al. ......... | 210/652 |
| 5,651,894 A | * | 7/1997 | Boyce et al. ............... | 210/652 |

* cited by examiner

Primary Examiner—Joseph W. Drodge

(57) ABSTRACT

This invention discloses a cost-effective process for separating contaminants and a wide-range of fouling material from surface water, ground water and from industrial effluents. Having undergone effective pre-treatment, the water can be purified further by using high-surface area spirally wound micro-filtration (MF), ultra-filtration (UF), nano-filtration (NF) or reverse osmosis (RO) membranes. High-quality potable water free from pathogen and other contaminants is thus produced at low-cost from the pre-treated surface water and ground-water. Conversely, pre-treated industrial effluents are further purified at a relatively low-cost using NF or RO membranes, thus producing water suitable for recycle or surface discharge. The process of this invention uses cationic inorganic and/or polymeric flocculants to coagulate and flocculate the water-borne colloidal matter (e.g. clays, iron hydroxides, naturally occurring matter (NOM's), etc.), followed by filtration using a multi-media filter, charge neutralization and reversal and final filtration using a 5-micron cartridge filter. These pre-treatment steps provides a good quality water having a low Silt Density Index and a significant negative zeta potential, thereby ensuring against irreversible chemical fouling of the spirally-wound membranes.

49 Claims, 4 Drawing Sheets

WATER TREATMENT PROCESS FOR MEMBRANES

This application claims priority from Provisional application Ser. No. 60/151,925, filed Jun. 1, 1999.

BACKGROUND OF THE INVENTION

One of the most important phenomenae undermining the performance of membrane processes used to purify potable water and industrial wastewater is membrane fouling and scale formation which reduces the membrane permeate flowrate and, if not mitigated, shortens the useful life of the membrane. The deposition of fouling material or scale compounds on the surface and/or inside the pores of the membrane will take place as a result of the increase in the concentration of these compounds at the membrane surface since they are rejected (i.e. separated) by the membrane.

Typical "membrane foulants" include colloidal suspended solids such as clays and silt, metal hydroxides such as iron hydroxide originating from corrosion of steel piping and tanks, naturally occurring organic matter (NOM) including humic substances, soluble organic compounds and insoluble "oil and grease" which are typically present in industrial effluents and "bio-foulants". The "bio-foulants" can be "aerobic" or "anaerobic" bio-mass which form due to the bio-degradation of organic compounds in the water in the presence, or absence, of oxygen, respectively. While "membrane foulants" affect all types of membranes, including reverse osmosis membranes (RO), nano-filtration membranes (NF), ultra-filtration membranes (UF) and micro-filtration membranes (MF), scale formation typically occurs in RO and NF membranes only as a consequence of "concentration" of "sparingly or partially soluble" inorganic scale compounds including calcium carbonate, silica and calcium sulphate when these compounds are rejected by these "tight" membranes. Before membranes can be used to purify water from various sources, the water must be pre-treated and conditioned in order to separate suspended solids, colloids, oil and grease and NOM's and provide a feedwater that is free from these membrane fouling compounds and is chemically compatible with the membranes.

PRIOR ART

A large number of pretreatment processes have been reported in the membrane and patent literature. These processes include the separation of colloidal suspended solids by coagulation and flocculation using inorganic multivalent metal hydroxides (e.g. aluminum sulphate or ferric chloride) and/or the highly effective flocculating cationic polymers (e.g. high molecular weight quaternary ammonium compound), respectively. This treatment is typically followed by clarification, depending on the suspended solids loading, and/or filtration using sand filters, dual-media filters or multi-media filters followed by a 5-micron cartridge filter. The multi-media filters contain a support layer of garnet or fine gravel, one or two layers of fine sand and anthracite.

Depending on the application, micro-filtration membranes may be used as an ultimate polishing step in addition to these chemical conditioning and filtration steps, or it may be used exclusively in lieu of these filtration steps. When the water contains high hardness due to calcium or magnesium, water softening resins may be used in the pre-treatment train. Activated carbon media may also be used to pre-treat industrial effluents containing organic compounds, as well as to remove free chlorine which chemically attacks the polyamide membrane film typically used in NF and RO membranes.

For example, Ebara et. al. Disclose in U.S. Pat. No. 4,080,289 a process for the treatment of industrial effluents using RO membranes in which said water is pre-treated by the addition of aluminum and/or iron salts in order to solubilize fluoride ions and prevent formation of calcium fluoride scale on the RO membranes as this compound is concentrated in the RO retentate. This patent also discloses a mechanical cleaning procedure of tubular RO membranes having surface deposits of scale and/or fouling material by using and recycling "sponge balls" to physically remove said scale and fouling material.

Smith discloses in U.S. Pat. No. 5,174,901 a membrane process for purifying wastewater which includes pre-treatment using a sand filter to remove particulate matter, an activated carbon filter to remove free chlorine and tri-halomethanes and a water softener to remove calcium, magnesium, iron and manganese compounds which would otherwise form scale on the membrane surface. The pre-treated water is then purified further with RO and ion exchange to separate soluble ions, organic and biological compounds and finally calcium salt and carbonic acid are added to the treated water to give a better tasting calcium-enriched water.

In another example of Prior Art, Arnaud discloses in U.S. Pat. No. 5,647,977 a system for purifying industrial effluents from laundry and vehicle washing operations. The system includes a coarse solids filtration device, aeration to fluidize and separate oil and other organic compounds, flocculation of colloidal solids, filtration of flocculated solids, activated carbon or polymeric resin to separate chlorine and organic compounds, high purity granular copper and zinc beds to separate heavy metals, two-stage anion exchange resins and two-stage cation exchange resins to remove organic compounds, prevent bio-growth and demineralize the water.

Furthermore, Boyce et. al. disclose in U.S. Pat. No. 5,651,894 a double-pass reverse osmosis process for producing ultrapure water in which the water is pre-treated by the addition of dithiocarbamate which produces a reducing environment to prevent bacterial growth and scavenge metals. The water is then purified with the 2-pass RO membranes and the RO-2 concentrate is recycled to the RO-1 feed at a reduced pressure to prevent generation of oxidants.

In U.S. Pat. No. 4,414,113, La Terra discloses a method for pre-treatment of water to be purified by hollow fiber reverse osmosis membranes. The raw water is directed into a pressure vessel containing a number of filter elements, which in turn have hollow fiber RO membranes wound around center cores such that the water flows from the outside of the filter elements towards the center cores. The pure permeate passes into the center bores of the fibers while the concentrate passes into the center cores of the elements.

Pohl et. al. disclose an RO pre-treatment method in U.S. Pat. No. 4,261,833 in which they teach precipitation and flocculation of metal hydroxides by using a combination of the acid salt and the acid having the same anion as the salt in order to produce the metal hydroxide at optimum pH. The resulting concentrated hydroxide flakes and flocculated colloids are separated in a 2-stage centrifuge, followed by acidification of the hydroxide precipitate and recycle of the acid/salt pair for further water treatment.

Henz et. al. disclose in U.S. Pat. No. 4,758,347 a process for purifying dyeing wastewaters by adjusting the pH with alkali or acid to the range 4 to 9 followed by coarse filtration to remove the suspended solids and adjusting the pH to the range 40–60° C. The pre-treated water is then subjected to a 2-stage RO membrane system in which the second stage permeate is recycled to the pre-treatment step and the first stage permeate is sent to a wastewater treatment plant for final treatment before discharge. The second stage concentrate is sent to a wet-air oxidation or combustion system to destroy the organic compounds.

In another related prior art, Comstock et. al. disclose in U.S. Pat. No. 5,374,357 a process for removing colloidal matter from raw water by passing the water through a finely divided filter media which is impregnated with a suitable coagulant. The water-borne colloidal matter is captured and deposited on the large surface of the filter media and is subsequently removed by back-washing of the filter media.

One of the most common problems encountered in the prior art above when using inorganic coagulants and cationic (polymeric) flocculating chemicals for the pre-treatment of water before subjecting the water to membrane purification is the relatively strong positive charge of these coagulating and/or flocculating compounds. This charge is required in order to neutralize the negative surface charge of the colloidal particles, also known as the "Zeta Potential", thus allowing these particles to agglomerate, flocculate, settle in the clarifier and/or separate efficiently by filtration through the media filter and cartridge filter. Unfortunately, these compounds must be applied in some excess concentrations and a residual concentration, must remain in the water after treatment in order to ensure adequate flocculation. This residual cationic flocculant concentration is deleterious to most commonly used polymeric MF, UF, NF and RO membranes.

Since most membranes possess a negative surface charge, any excess cationic polymer will be attracted to the membrane surface where it will form a chemical bond and deposit as a resilient film which is very difficult to remove by cleaning. These compounds will "blind" the surface and result in a sharp decline in the membrane permeate flux. Prior art does not disclose the membrane "fouling" effect due to the excess cationic charge in the commonly used coagulants and flocculants.

Fouling of the membrane surface also occurs due to reaction of excess cationic polymer or multivalent cations with the negatively charged scale inhibitor compounds which are typically introduced into the water before the NF or RO membranes in order to prevent scale formation due to the water hardness compounds. Chemical reaction between the flocculating polymer and the polymeric scale inhibitor will form a "sticky", resilient, high molecular weight organic substance that coats the membrane surface and results in a severe loss of the membrane permeate flux. This substance is difficult to clean and could indeed shorten the membrane's useful life.

A number of devices and techniques have been developed in order to control and optimize the flocculant dosage in order to reduce the cost of water treatment chemicals. Most of these techniques are based on continuous measurement of the particles' surface charge and automatic adjustment of the flocculant dosing pump output in order to control its concentration in solution. However, these techniques are only partially effective since, apart from control "difficulties", the formation of the deleterious "cationic film" on the membrane surface requires only a small concentration of the polymer, even as low as 0.1 mg/liter.

Other contaminants not adequately addressed by prior art pre-treatment processes include iron and manganese, oil and grease and soluble organic compounds. Iron hydroxides are particularly problematic for membranes since, in their chemically reduced state, they form a "gelatinous" film which strongly adheres to the membrane surface and also deposits and oxidizes within the membrane pores. A typical treatment method for iron (and manganese) involves the oxidation of the relatively soluble ferrous ions, $Fe^{2+}$, to the insoluble ferric ions, $Fe^{3+}$ using air and/or chemical oxidants, including chlorine, hydrogen peroxide and "Green Sand" beds. Unfortunately, these oxidizing chemicals are "non-specific", attacking all other oxidizable organic compounds, and they are quite costly to use, especially when the concentrations of the iron and/or manganese ions are considerable, e.g. >10 mg/liter. Furthermore, the presence of excess chemical oxidant such as chlorine or hydrogen peroxide in the pre-treated water is deleterious to the polymeric membranes. On the other hand, sparging air through the contaminated water inside a storage tank and/or feed tank is not always effective in oxidizing the soluble ferrous iron compounds because of the relatively poor contacting efficiency of these devices and also because iron often occurs in its chelated form or as a relatively stable ion complex.

The presence of insoluble "oil and grease, O&G" in the water also presents a serious technical challenge for RO and NF membranes since these membranes can not tolerate O&G concentrations in excess of 1 mg/L. Oil and grease may be removed by various techniques including the use of an oil coalescer, oil skimmer and granular activated carbon. While ultra-filtration membranes can also separate emulsified oils effectively, these membranes are quite costly to use as means to pre-treat water before RO or NF membranes. Furthermore, the presence of O&G in the wastewater is usually associated with biological growth and concomitant bio-fouling of the membranes.

On the other hand, soluble organic compounds in the water will not directly foul membranes unless their solubility limits are exceeded and they begin to form a separate phase. This may happen as the concentration of these compounds increases because of rejection (i.e. separation) by the RO or NF membranes. More importantly, however, the presence of soluble organic compounds in water is invariably associated with biological activity and the formation of a significant microbial population under aerobic, anoxic and/or anaerobic conditions, depending on the availability of oxygen. This phenomenon will result in "bio-fouling" of the membrane since the micro-organisms will be effectively separated by MF, UF, NF and RO membranes, and they attach themselves to the surface of the membrane where they will metabolize the organic "food" source in the water. While membrane bio-fouling represents a serious problem that must be addressed, anaerobic biological activity is particularly deleterious to the membranes, resulting in complete and often irreversible loss of membrane permeate flux.

When the concentration of biodegradable organic compounds in the water is significant, (i.e. COD >100 mg/L) these compounds are best aerobically biodegraded under controlled conditions and the sludge thus produced be separated by the appropriate clarification and/or membrane filtration before the water can be further purified by NF or RO membranes. Chemical oxidation of soluble organic compounds in water is typically practiced only when the concentration of organic compounds is low and when the nature of these compounds is such that they can be oxidized effectively and completely, producing harmless byproducts.

The present invention provides effective low-cost means for pre-treatment of raw water and industrial effluents containing these compounds, while ensuring the chemical compatibility of the pre-treated water with the membranes used downstream.

EXAMPLES OF MEMBRANE PRE-TREATMENT APPLICATIONS

The problem of contamination of surface water from lakes and rivers with *E-Coli,* Giadia and *Crypto-sporidium* pathogens from untreated sewage and farm animal rejects has become a serious health challenge with many townships periodically imposing "boil water" advisories or installing special high-cost hollow fiber or tubular micro-filtration or ultra-filtration membrane systems. Since some of these pathogens can not be destroyed by chlorination and must be removed by physical separation, membrane filtration provides the most effective, safe and reliable approach to produce potable water from contaminated surface water or ground water.

When the potable water sources have high Total Dissolved Solids (TDS), high hardness and/or colour problems, "tighter" membranes namely NF or RO membranes must be used. However, these latter membranes are typically fabricated from spirally-wound membrane flat sheets having different polymer chemistry than the MF and UF membranes, and are thus more prone to fouling with colloidal solids and biological solids. This will necessitate using hollow fiber or tubular MF or UF membranes upstream of the NF or RO membranes as a pre-treatment step in order to separate colloidal matter and ensure minimum fouling and adequate life of these spirally-wound membranes. These treatment procedures (i.e. using hollow fiber or tubular MF or UF in addition to spirally-wound NF or RO membranes) are costly, especially when it is required to treat large volumes of potable water.

In addition to the colloidal suspended solids associated with surface water, industrial effluents will also contain soluble iron, soluble organics and oil and grease contaminants which must also be treated and removed before the water can be purified with spirally-wound NF or RO membranes. If the water is not "conditioned" and pre-treated effectively, the iron hydroxides and the organic and bio-foulants will not only foul the NF or RO membranes, but they will also undermine the performance of the costly MF or UF "pre-treatment" membranes.

Since the capital and operating costs of spirally-wound membranes per unit of membrane surface area are much lower than hollow fiber or tubular membranes, there is a strong economic incentive to improve the "feed water" quality by separating suspended solids, metal hydroxides, oil and grease and bio-foulants using new, effective, low-cost pre-treatment methods. With these low-cost pre-treatment methods, it would be possible to produce high quality potable water or recycled industrial water by using the relatively low-cost spirally-wound MF or UF membranes on their own when the water contains low TDS, hardness and colour, or by using spirally-wound NF or RO membranes when the water contains significant concentrations of TDS, hardness or colour, in addition to the colloidal solids and microbial contaminants.

To summarize, the problems associated with prior art, namely excessive suspended solids, residual cationic flocculant concentration, residual unoxidized iron and manganese ions, oil and grease and organic fouling and anaerobic, anoxic and aerobic biofouling, render pre-treatment ineffective or only partially effective and the performance of the ultimate membrane purification step is therefore undermined. This invention effectively addresses these limitations by applying effective, low-cost pre-treatment steps, followed by using a low-cost spirally-wound membrane purification step.

SUMMARY OF THE INVENTION

The current invention addresses the serious limitations associated with prior art pre-treatment methods and provides an effective low-cost process to treat surface water, ground water and industrial effluents in order to separate undesirable contaminants and produce "potable water" and recycled (or dischargable) industrial waste water, respectively.

This invention utilizes a "high efficacy" polymeric cationic coagulant and flocculant, as per prior art, which is mixed rapidly, injected into the water and then allowed a sufficient retention time in order to bring about the efficient agglomeration of colloidal clay, iron hydroxide and NOM particles. The large floc particles thus produced can subsequently be separated by direct filtration through a suitable multi-media filter (MMF) consisting of a shallow but tough support layer of garnet, a main thick layer (i.e. approx. 1–2 ft depth) of fine sand consisting of particles in the size range 0.3–0.5 mm, and a top layer of anthracite or granular activated carbon of approximately 1 ft depth. The linear flow velocity through the MMF must be controlled at approximately 3 U.S. gpm per square foot of bed cross-sectional area in order to ensure efficient contacting and mass transfer.

One of the main features of the process of this invention is the "charge neutralization" and reversal step in which any positively charged excess or residual cationic polymer molecules or particles passing through the MMF are safely neutralized or more preferably turned into an excess negative charge which is compatible with any MF, UF, NF and RO membranes used downstream. The source and type of the negative charge applied to the water after the MMF will depend on the volume of the water being treated and the end-use of this water.

The charge neutralization step will therefore consist of a high voltage capacitor installed in the form of a probe inside the water line, at a suitable distance upstream of the final membrane treatment step. Another method of neutralizing the positive charge due to the cationic polymer involves using a suitable ion exchange resin including a cationic resin and/or a chelating resin which will adsorb the flocculant's cationic charge preferentially, leaving chemically compatible soluble ions in the water. Another form of charge neutralization which may be introduced in the case of low volumes of treated water is achieved by the addition of an alkali solution, e.g. sodium hydroxide. Yet another method of charge neutralization is achieved by the addition of a small concentration of a polymeric anionic surfactant to the water downstream from the MMF, thus neutralizing the excess positive charge of the cationic flocculant.

The water leaving the charge neutralization/charge reversal step is filtered using a 5-micron cartridge filter to remove any insoluble compounds formed as a result of the charge neutralization step. The water thus produced will have a compatible negative charge and a low Silt Density Index (SDI) of <5. This water represents a suitable feed to the spirally-wound MF, UF, NF and RO membranes which are used in the last water treatment step. Depending on the objective of the last membrane water purification step and the composition of the pre-treated raw water, either spirally-wound MF, UF, NF or RO membrane will be used. In this water purification step, the membrane will separate any remaining pathogens and biological contaminants, oil and grease, water hardness and dissolved solids, thereby producing pure permeate which is safe to drink, recycle or discharge. This permeate may be subjected to a final "chlorination" treatment step in order to guard against further microbial contamination during water storage and distribution. The concentrate from the membrane treatment step is discharged, treated further or disposed of in a safe manner. Because of the above pretreated water chemical (i.e. charge) and physical (i.e. low TSS and SDI) compatibility with the membranes, it will be possible to use spirally-wound membranes in lieu of the more costly hollow fiber or tubular membranes which are sometimes used in the prior art, thus rendering this invention more economical than the prior art.

This and other embodiments of the present invention are further described in the next sections.

The present invention provides an efficient and economical method for the pre-treatment of water containing colloidal suspended solids, metal hydroxides, oil and grease, soluble organic compounds and biological solids, upstream of (i.e. before) the membrane treatment step. Effective pre-treatment of the water is needed in order to minimize the fouling potential of the membranes, maintain high membrane permeate throughput and prolong the membrane life. Four important examples illustrating the process of the invention are provided schematically in FIGS. 1, 2, 3 and 4.

BRIEF DESCRIPTION OF THE DRAWINGS

FIG. 1 shows the six main steps of the process including the coagulation/flocculation step, direct filtration using multi-media filter, charge neutralization/reversal step, cartridge filtration, membrane purification step using MF or UF membranes and finally the purified water chlorination step.

Figure 3:
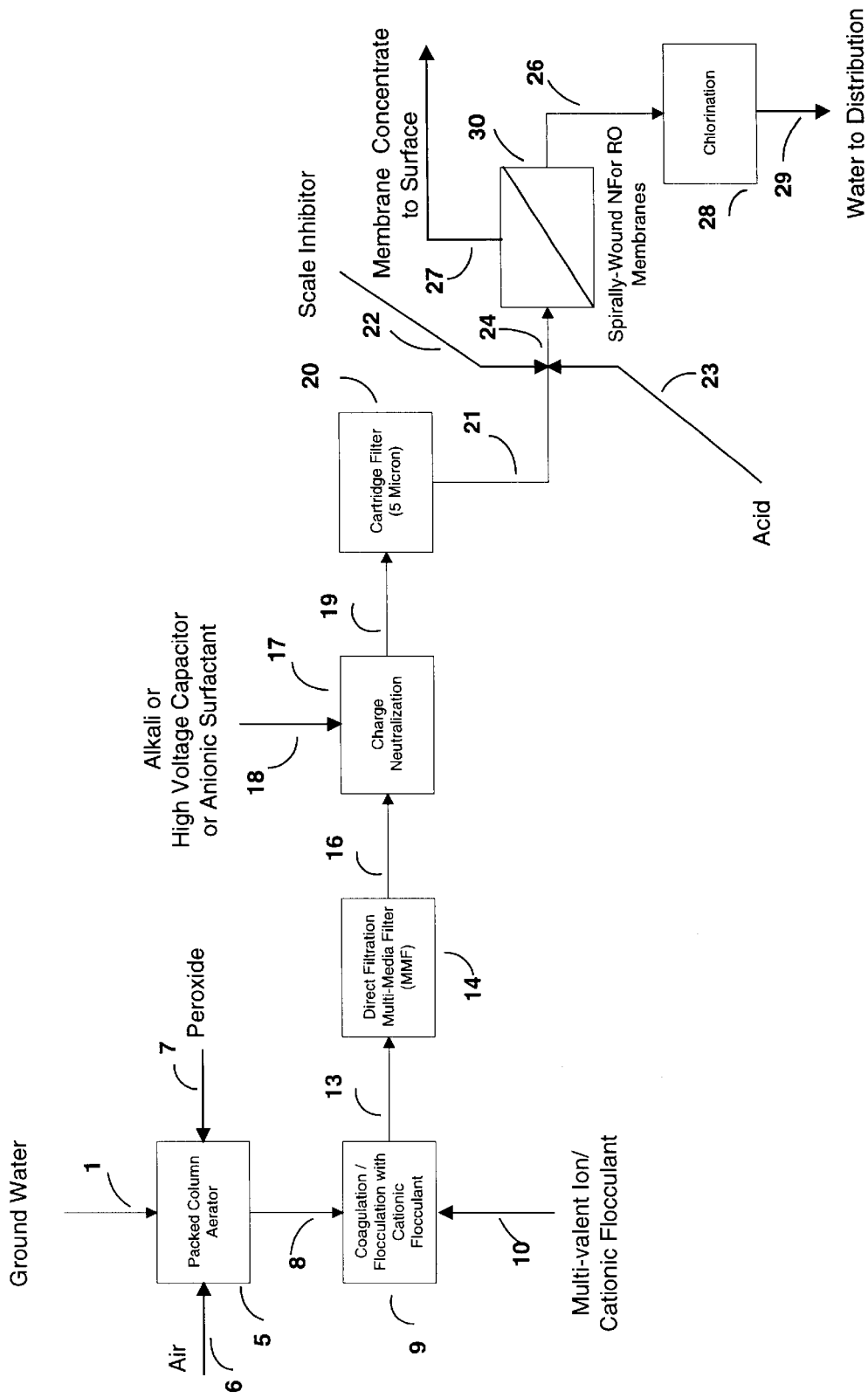
FIG. 3 represents yet another embodiment of this invention in which groundwater must be treated in order to produce potable water. Groundwater can be relatively free from colloidal "suspended" solids, low in NOM's and will therefore have a reasonably low Silt Density Index, SDI, often <5. However, groundwater will often contain substantial concentrations of soluble iron and manganese compounds as well as hardness ions including calcium, magnesium, carbonate and sulphate. Frequently, groundwater contains relatively high Total Dissolved Solids, TDS, which must also be reduced in order to meet "drinking water quality guidelines" of <500 mg/l and preferably <300 mg/l. The present invention provides an effective means to oxidize iron and manganese using a Packed Column Aerator in order to provide efficient contacting, and supplying air, as well as hydrogen peroxide, in order to enhance the chemical oxidation effectiveness, followed by coagulation and flocculation by adding an effective cationic polymer, as described earlier. A multi-media filter (MMF) is then used to separate flocculated particles. The excess positive charge due to the coagulant/flocculant is then neutralized in the charge neutralization/reversal step and any residual floc will subsequently be separated by the 5-micron cartridge guard filter which is placed before the membranes. Since the groundwater contains a significant concentration of hardness precursors such as calcium, magnesium, silica, carbonate and sulfate, the water must be conditioned further by the addition of an inorganic or polymeric scale inhibitor. The water is then introduced into the membrane purification step which will comprise an NF membrane or, depending on the TDS, an RO membrane. As before, the potable water thus obtained may be further treated by chlorination in order to inhibit bacterial growth and maintain sanitary conditions in the water distribution system.
Figure 4:
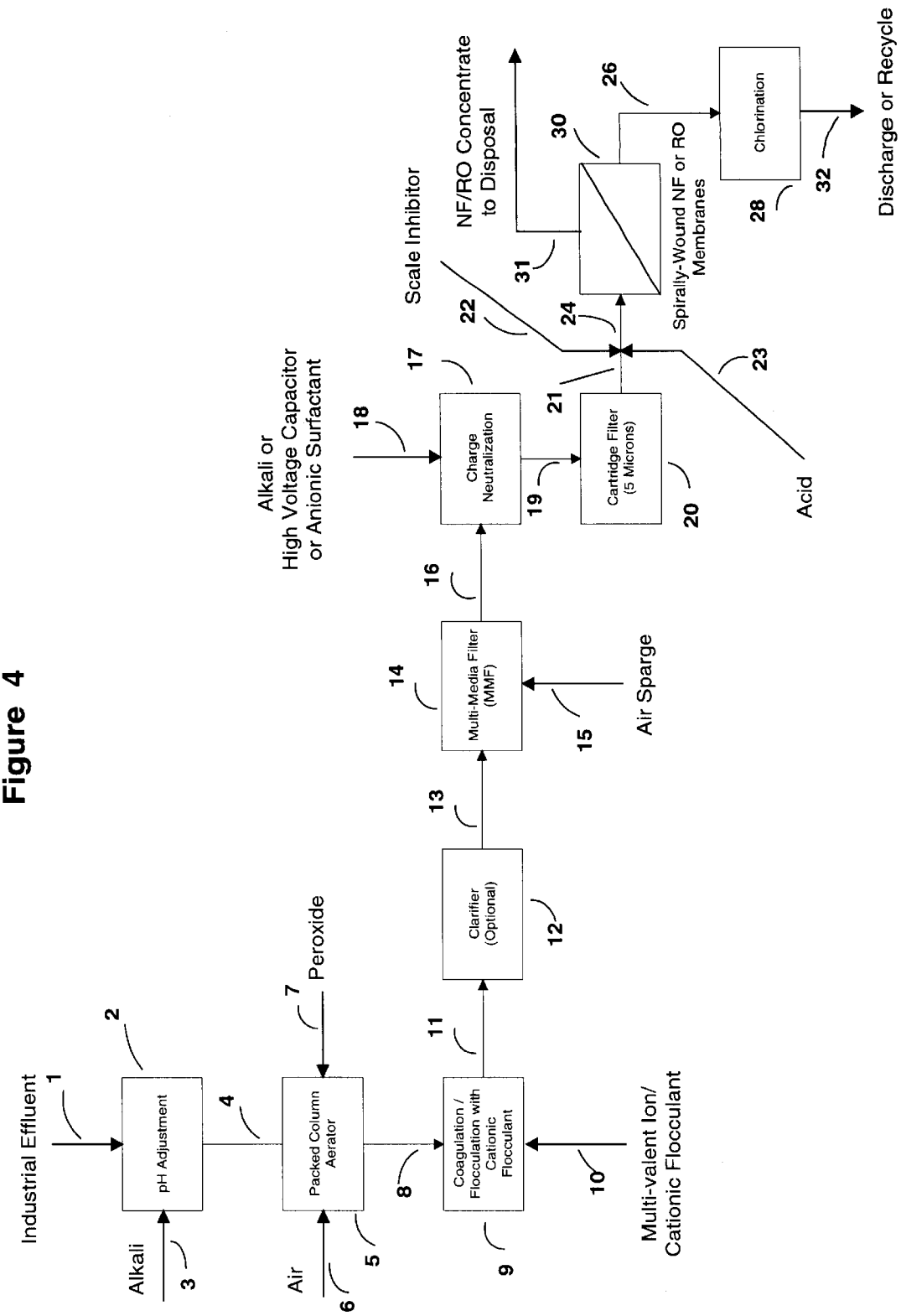

Yet another mode of the present invention is discerned by reference to FIG. 4 which represents the pre-treatment and purification of a relatively low flowrate of an industrial effluent (i.e. wastewater) which contains colloidal suspended solids, high TDS, significant concentration of iron, hardness metals and silica, oil and grease and soluble organic compounds. The treatment scheme is similar to FIG. 3, except for the addition of up to two new pre-treatment steps including pH adjustment of the wastewater and, depending on the concentration of suspended solids and precipitated iron hydroxide, a clarifier may also be needed upstream from the MMF.

Description of a Preferred Embodiment

Figure 1:
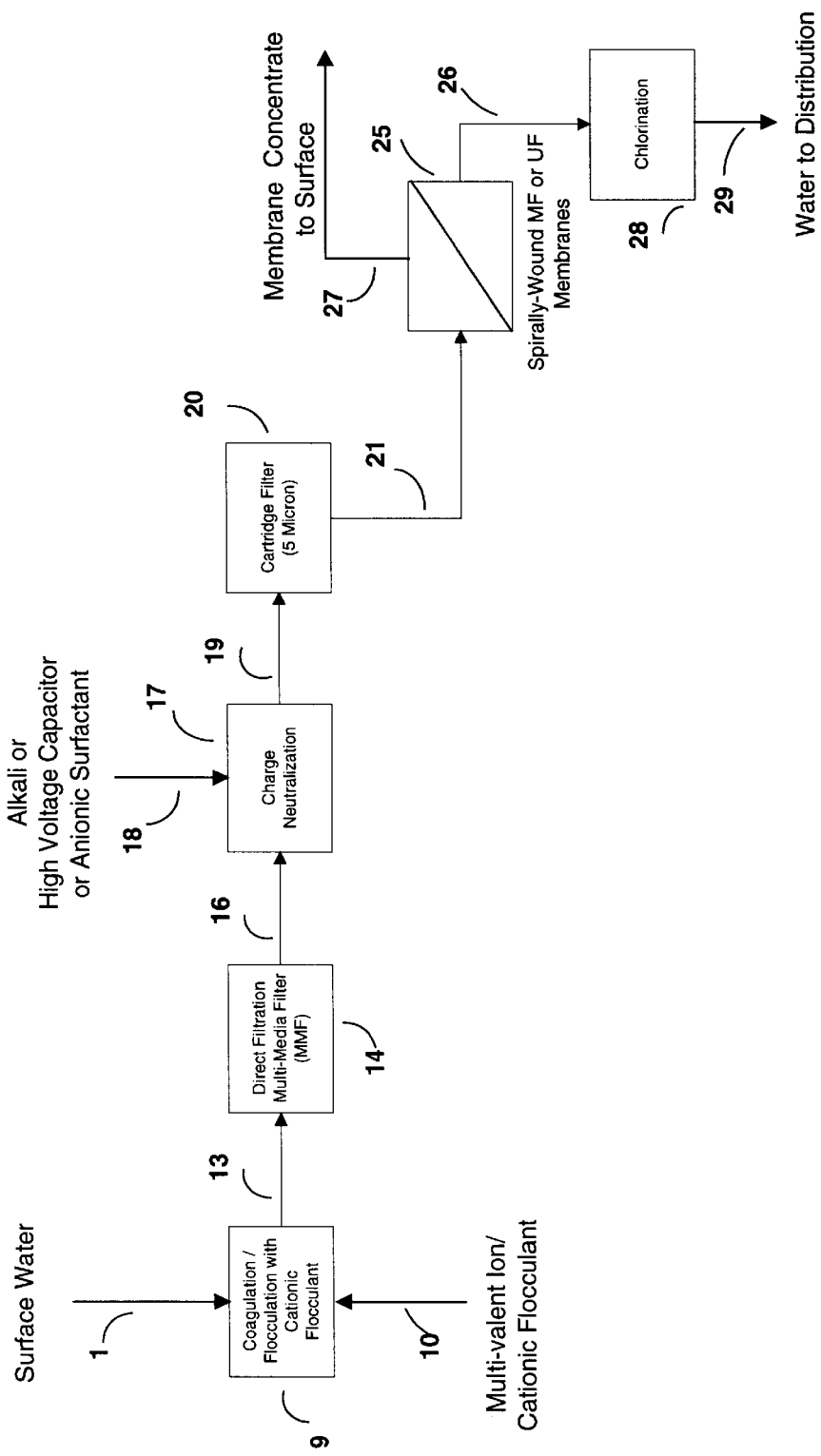
FIG. 1 depicts an exemplary process in accordance with the present invention which applies to the treatment of large flowrates of natural (i.e. surface water) streams containing colloidal clay and silica particles, naturally occurring organic matter (NOM) including humic substances, and biological solids including algae, *E-Coli,* Giardia and *Crypto-sporidium* micro-organisms.

Referring now to the drawings in more detail, and particularly to FIG. 1, therein is depicted an exemplary water treatment process in accordance with the present invention. This process treats large flowrates of raw surface water which contain colloidal solids, naturally occurring organic matter (NOM) and other biological particles, algae and micro-organisms. The process includes six distinct treatment steps including a coagulation/flocculation step, multi-media filtration (MMF), charge neutralization and reversal, 5-micron cartridge filtration step, spirally-wound microfiltration (MF) or ultra-filtration (UF) water purification step and a final chlorination step.

Raw surface water 1 is thus mixed intimately for up to 15 minutes in tank 9 with a coagulating/flocculating chemical 10 which includes one or more of the following: lime, aluminum sulphate, aluminum chloride, poly-aluminum chloride, ferric chloride and/or bentonite clay or other materials known to promote flocculation and settling of suspended solids. A selected cat-ionic polymer (e.g. a polyquaternary amine such as Nalco's potable water coagulant: Nalcolyte 8103) is also added in order to provide effective flocculation of solids.

The flocculated suspension 13 is filtered directly using a multi-media filter 14 consisting of a bottom garnet support layer of 3–4 inch thickness and 0.625–1.0 inch particle size, followed by up to three 3-inch layers of gravel with particle size ranges of 0.25–0.5 inch, 0.13–0.25 inch and 0.07–0.13 inch respectively. On top of the gravel support is placed a thick layer of fine sand of a particle size range 0.35 mm–0.65 mm and preferably 0.5 mm, with a minimum depth of 1.5–2 ft. On top of the fine sand is placed a 1 ft layer of anthracite or more preferably granular activated carbon with a particle size of 0.6–0.7 mm, perhaps covered with a top 3-inch layer of medium sand of 0.8–1.0 mm. The water containing flocculated solids shall be introduced into the top of the multi-media filter 14 at a linear velocity in the range 3–5 gpm per sq ft of the cross-sectional area of the bed.

The filtered water 16 exiting the multi-media filter (MMF) will be relatively free from suspended solids but will invariably contain a small residual concentration of the cationic flocculating polymer and the positive electric charge associated with it, as well as any fine particles passing through the MMF filter. In accordance with the present invention, this residual positive charge is neutralized and reversed, i.e. a negatively charged particle field is produced, by using an in-line high voltage capacitor 17, e.g. the Zeta-Rod™ electrode manufactured by Zeta Corporation of Tuscon, Ariz. This device will produce a continuous electrostatic field and impart a negative "zeta potential" into the water and onto any particles escaping the MMF filter, thereby maintaining complete dispersion and preventing re-deposition of the excess cationic polymer molecules on the negatively charged membrane surface. This imposed negative charge of the water will also ensure against reaction of the residual cationic polymer with any negatively charged scale-inhibitor or dispersant which may be added immediately before the NF or RO membranes in the processes of FIGS. 2, 3 and 4 in order to prevent scale formation.

Another method of neutralizing and reversing the residual positive charge due to the cationic polymer in stream 16 involves using a suitable ion exchange resin 17 including the C-100 strong acid cation exchange resin (sodium form) manufactured by The Purolite Company of Bala Cynwyd, Pa. These resins will adsorb the flocculant's cationic charge and other insoluble, positively charged particles preferentially, leaving chemically compatible soluble ions in the water. The water treated in this manner will have a Silt Density Index (SDI) less than 5 which corresponds to a low membrane fouling and plugging factor. These resins also have the advantage of separating hardness elements (i.e. calcium and magnesium) from the water when used in their sodium form. This will allow the RO membranes in the processes of FIGS. 2, 3 and 4 to be operated at high permeate recoveries in excess of 80% without the formation of harmful crystalline calcium or magnesium scale compounds on the RO membrane surface.

Yet another method of charge neutralization and reversal (unit 17) is achieved by the addition of a small concentration of a polymeric electrolyte 18 from a group of compounds known as anionic surfactants to the water downstream from the MMF, thus neutralizing the excess positive charge of the cationic flocculant. In contrast with the above-described positive charge neutralization methods, this treatment will likely produce insoluble high molecular weight organic compounds which will be dispersed in the water 19. These compounds will be trapped in the 5 micron "depth filter" cartridge 20 used as a membrane guard. The water 21 leaving the 5 micron cartridge filter 20 will have a negative charge and a Silt Density Index (SDI) <5. By separating the colloidal matter using coagulation and flocculation 9 followed by media filtration 14 and excess cationic charge neutralization and reversal 17 and fine filtration 20, the pre-treated water 21 can be fed directly into spirally-wound MF, UF, NF and RO membranes 21 in order to achieve cost-effective purification of the water.

Yet another method of charge neutralization and reversal for low flowrates of treated water is achieved by the addition of an alkali solution, specifically sodium hydroxide 18. The alkali solution is added at such concentration as to maintain a pH in excess of 9, and preferably >11, at which pH positive cationic charges will be turned into a negative charge which is more compatible with the MF, UF, NF and RO membrane used downstream. Since raising the water pH will increase the scale potential of the water, a scale-inhibitor 22 must also be added before the NF or RO membrane purification step 30 depicted in FIGS. 2, 3 and 4. If the water 32 is to be discharged to surface after treatment, as per FIG. 4, the pH of the treated water must be lowered, if necessary, by adding a suitable mineral acid.

After achieving charge neutralization and reversal in 17, the water 19 is admitted into a suitable depth-type or membrane-type cartridge filter or bag filter 20 of 5-micron nominal pore size or tighter in order to protect the spirally-wound membranes 25. This cartridge filter will separate any residual entrained particles that pass through the MMF filter 14, as well as particles that form as a result of charge neutralization 17. Treatment of the water through the MMF bed 14 and 5-micron cartridge filter 20 will produce water 21 with an acceptably low Silt Density Index, SDI, in the range 3–5.

By achieving low pre-treated water SDI and ensuring charge compatibility with the membranes, it will be possible to use cost-effective spirally-wound membranes in lieu of the hollow fiber or tubular membranes used in the prior art, thereby rendering the process of this invention more economical than prior art.

Pre-treated water 21 from the 5-micron cartridge filter is then pumped under pressure into the membrane purification step 25 which comprises a micro-filtration membrane of a pore size in the range 0.1–0.2 micron, or an ultra-filtration membrane of a yet smaller pore size, in the range 0.005–0.05 micron. This treatment will ensure the separation of all harmful micro-organisms, including the giardia and *cryptosporidium* pathogens, thereby rendering the membrane permeate water 26 safe and drinkable. The membrane will also separate all sub-micron colloidal particles, including metal hydroxides, thus reducing the turbidity to <0.1 NTU's and improving the colour and appearance of the water 26. The membrane concentrate stream 27 will contain all the rejected suspended solids including fine colloidal matter which escapes upstream treatment. This concentrate stream 27 can be re-directed to surface since its quality is equal to or better than the incoming surface water 1. If the pH is higher than the limits for surface discharge because of the charge neutralization step 17, the pH must be adjusted accordingly by adding a mineral acid. Prior to water distribution, the MF or UF permeate water 26 is chlorinated in unit 28 by adding up to 1.0 mg/l of "free chlorine" in order to guard against re-growth of micro-organisms. As an alternative to chlorination, UV radiation treatment can also be applied in order to control biological growth in the treated water 29.

Figure 2:
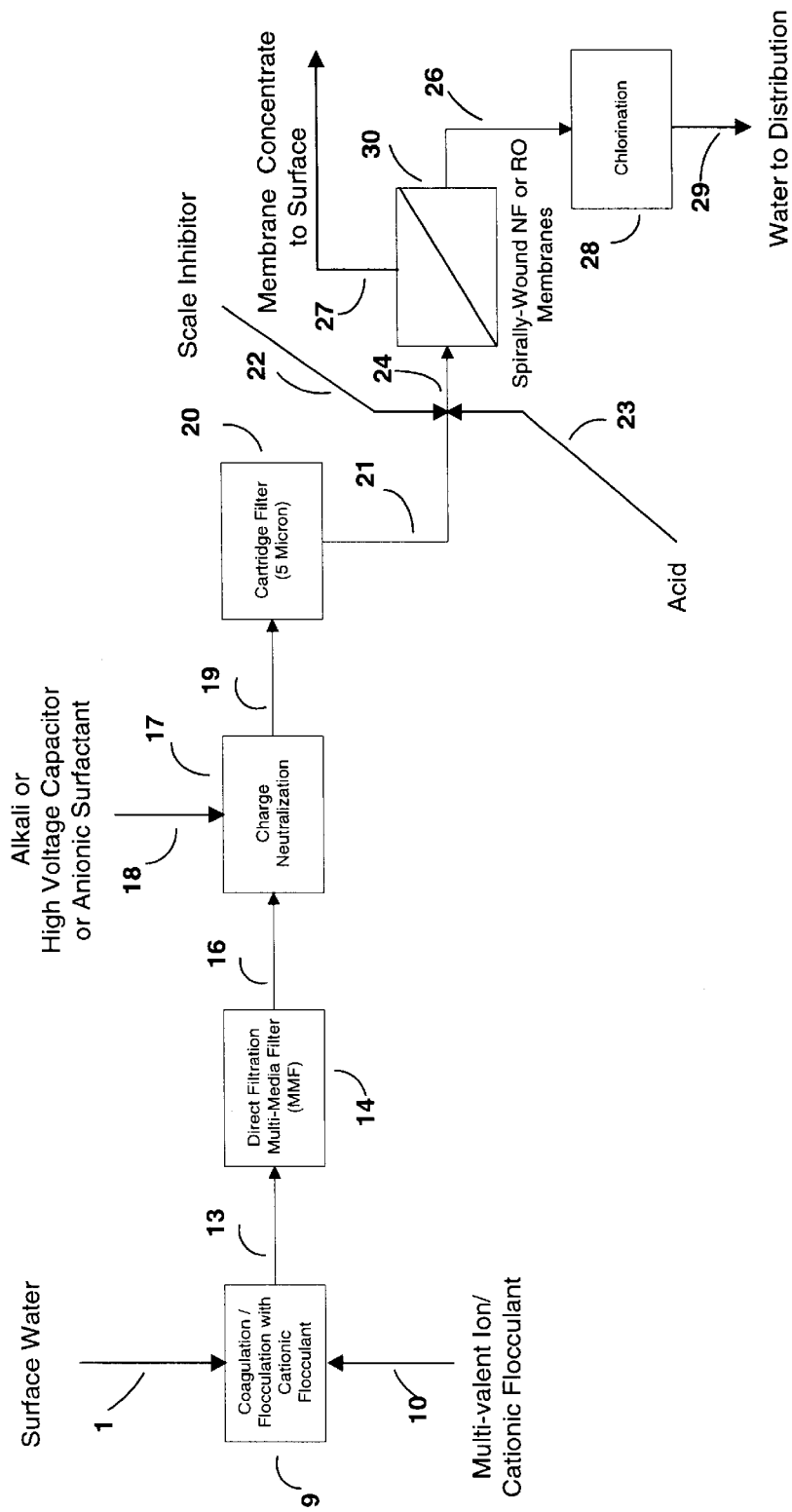
FIG. 2 represents another useful embodiment of the invention in which the surface water fed to the process also contains "colour contamination" caused by naturally decaying vegetation and hardness. As described above, this type of water can also be pre-treated effectively by the process of this invention, including a coagulation/flocculation step, MMF filtration step, charge neutralization step and 5-micron cartridge filtration. Instead of using spirally-wound MF or UF membranes in Step 5, however, this embodiment utilizes spirally-wound nano-filtration (NF) or reverse osmosis (RO) membranes to separate colour due to humic substances, water hardness and other multivalent ions, thus delivering softened purified drinking water which is free from microbial contamination.

FIG. 2 represents another embodiment of the invention described above, except that in this case spirally-wound nano-filtration (NF) or reverse osmosis (RO) membranes 30 are used in lieu of the spirally-wound MF or UF membranes. NF or RO membranes are used in order to ensure separation of colour, humic substances, water hardness and/or dissolved minerals, as well as biological contaminants. In order to guard against precipitation of calcium and magnesium hardness on the NF or RO membranes upon concentration of these compounds, a scale inhibitor 22 is added to the pre-treated water 21. The scale inhibitor is selected from a group of polymeric compounds including polyacrylic acid and polyphosphates (e.g. sodium hexametaphosphates). The pH of the water will also be reduced to a pH in the neutral range (i.e. 6–8) in order to guard against precipitation of calcium and magnesium carbonate on the NF and RO membranes.

The embodiment represented by FIG. 3 of this invention teaches a process similar to the process of FIG. 2 except in this case the ground water to be treated 1 contains iron, manganese, hardness and a relatively high total dissolved solids (i.e. TDS). The present invention provides an effective method to oxidize and precipitate iron and manganese using a Packed Column Aerator 5 in lieu of the conventional in-tank air sparging devices. The packed column aerator 5 comprises a counter-current flow system with the water 1 distributed over the top of the column packing using a suitable water distributor. Air 6 is supplied from the bottom via a blower and through the column packing support, flowing upwards counter-current to the water flow. The column contains at least 3 ft of high efficiency random packing made of plastic material or stainless steel, including Pall Rings, Intalox Saddles, Levapak, etc. The size of the packing is graded with larger units (e.g. 3-inch pieces) at the bottom 1 ft immediately above the support grid, followed by a 1–2 ft layer of smaller pieces (i.e. 2-inch) and a final 1–2 ft layer of 1–1.5 inch packing pieces at the top, thus ensuring intimate contacting with air and oxidation of the iron and manganese ions. In order to further enhance the oxidation of iron and manganese, a solution of hydrogen peroxide of 5–10% strength shall also be used, especially when the iron is in a chelated form. The peroxide can be injected into the water stream at the top of the column before the liquid distributor. The aerated, oxygen-rich water 8 is then treated by the same process steps of FIG. 2, i.e. coagulation, flocculation, MMF filtration, charge neutralization, cartridge filtration and finally by spirally-wound NF or RO membranes, followed by treated water chlorination.

The embodiment of FIG. 4 is similar to FIG. 3, except that industrial effluent 1 containing colloidal solids, high iron and manganese, hardness metals and silica, high TDS, oil and grease and soluble organics, must in this case be treated while mitigating chemical and biological fouling of the spirally-wound NF or RO membranes. The pH of the wastewater is increased in 2 by the addition of alkali solution 3 in order to de-stabilize iron and other heavy metals which are complexed in the presence of organic compounds. The pH adjusted water 4 is then introduced into the counter-current Packed Column Aerator 5 which will ensure complete oxidation of the iron and manganese. As before, air 6 and hydrogen peroxide or ozone 7 will be used if iron or manganese are in a a stable complex form. The Packed Column Aerator 5 will serve the secondary function of maintaining aerobic conditions, preventing the growth of anaerobic bacteria which will be deleterious to the spirally-wound NF or RO membranes 30. The packed column may in fact support the growth of aerobic biological activity and the bio-conversion of the soluble organics. The packed column then becomes a chemical oxidation device as well as a biological reactor which will guard against anaerobic bio-fouling of the membranes. Any chemically or biologically oxidized compounds, colloidal solids and biomass in stream 8 will be coagulated and flocculated in unit 9 using a cationic flocculant 10 and the floc 11 thus formed is either filtered using the MMF 14 or if the concentration of suspended solids is >50–100 mg/l, is clarified in a suitable inclined plate "lamella" clarifier 12 before filtration using the MMF filter 14. Air 15 is also sparged through the bottom of the MMF filter in order to maintain "membrane-favorable" aerobic conditions. The remaining treatment scheme after the MMF is quite similar to FIG. 3, including charge neutralization 17, cartridge filtration 20, water conditioning with a scale inhibitor 22, pH adjustment with acid 23, water purification using spirally-wound NF or RO membranes 30, chlorination 28 of the treated water and discharge or recycle of this water 32 for plant use.

What is claimed is:

1. A membrane process for the economical treatment and purification of surface water containing colloidal suspended solids, natural organic matter (NOM) and biological contaminants which separates contaminants and produces safe drinking water while eliminating irreversible chemical fouling of the membrane surface, comprising:

a) Adding a multi-valent metal coagulant and a cationic flocculant and mixing the chemicals in said surface water to form a stable floc containing all the colloidal suspended solids, natural organic matter (NOM) and biological contaminants;

b) Filtration of said surface water to separate the flocculated solids using a multi-media filter (MMF) bed providing pre-filtered water which contains a slight excess of the flocculating cationic flocculant which comprises a polymer and a positive charge associated with the polymer and residual unfiltered particles;

c) Neutralization and reversal of the excess positive charge in said pre-filtered water to produce a slightly negatively charged pre-filtered water;

d) Fine Filtration of said slightly negatively charged pre-filtered water using a filter selected from a group consisting of woven fabric depth filters, bag filters membrane cartridge filters and combinations thereof and having a nominal pore size equal to or less than 5 $\mu$m, producing pre-treated water having a Silt Density Index (SDI)<5;

e) Pressurizing and introducing said pre-treated water into the high pressure side of a membrane system to produce a purified membrane permeate as drinking water on the low pressure side of said membrane system which is free from colloidal and microbial contaminants and a membrane concentrate on the high pressure side of said membrane system which contains all residual contaminants and to discharge said membrane concentrate safely to receiving waters or to sanitary sewers; and f) Disinfection of said drinking water before distribution.

2. The membrane process in accordance with claim 1 wherein the coagulant is selected from a group of inorganic multivalent compounds consisting of lime, aluminum chloride, ferric chloride, aluminum sulfate, poly-aluminum chloride, bentonite clay and combinations thereof.

3. The membrane process in accordance with claim 1 wherein the flocculant is selected from a group of strongly cationic flocculating polymers consisting of polyquaternary amines, quaternary ammonium salts and combinations thereof.

4. The membrane process in accordance with claim 1 wherein said MMF bed consists of a 3–4 inch garnet support layer, three 3-inch layers of gravel with progressively decreasing particle size, a 1.5–2 ft layer of fine sand of approximately 0.5 mm mean particle size, a 1 ft layer of a granular activated carbon or anthracite with a particle size of 0.6–0.7 mm and a 3-inch top layer of medium sand having a particle size of 0.8–1.0 mm.

5. The membrane process in accordance with claim 4 wherein the flowrate of said surface water per unit cross-sectional area of said MMF bed is maintained in the range 3–5 gallons per minute per square foot.

6. The membrane process in accordance with claim 1 wherein neutralization and reversal of the excess positive charge of said pre-filtered water is achieved by using an in-line high voltage capacitor to produce a continuous electrostatic field and impart a negative "zeta potential" into said pre-filtered water and onto any particles escaping said MMF bed.

7. The membrane process in accordance with claim 1 wherein neutralization and reversal of said excess positive charge of said pre-filtered water is achieved by using a cation exchange resin selected from a group consisting of strong acid cation exchange resins in the sodium form, weak acid cation exchange resins and combinations thereof.

8. The membrane process in accordance with claim 1 wherein neutralization and reversal of said excess positive charge is achieved by adding to said pre-filtered water a small concentration, in the range 5–20 mg/l, of a polymeric electrolyte selected from a group of compounds known as anionic surfactants consisting of poly-alkoxy carboxylates, poly-acrylates, alkylbenzene sulfonates and combinations thereof.

9. The membrane process in accordance with claim 1 wherein neutralization and reversal of said excess positive charge is achieved by the addition of an alkali solution selected from a group of compounds consisting of sodium hydroxide, sodium carbonate, lime and combinations thereof.

10. The membrane process in accordance with claim 9 wherein the pH of said pre-filtered water is adjusted to the range 9–11.

11. The membrane process in accordance with claim 1 wherein the membrane elements used to purify said pre-treated water are made from a low-cost spirally-wound membrane sheet.

12. The membrane process in accordance with claim 1 wherein the membrane elements used to purify said pre-treated water are made from hollow fiber elements.

13. The membrane process in accordance with claim 1 wherein the membrane elements used to purify said pre-treated water are made from tubular membrane elements.

14. The membrane process in accordance with claim 1 wherein the membrane elements used to purify said pre-treated water are selected from a group consisting of "disc tube" membrane elements, plate and frame membrane elements and combinations thereof.

15. The membrane process in accordance with claim 11, 12, 13 or 14 wherein said membrane is selected from a group consisting of micro-filtration membranes (MF) that separate residual colloidal solids including clay and silt, organic matter, tri-halomethanes (THM), algae and microbial contaminants.

16. The membrane process in accordance with claim 11, 12, 13 or 14 wherein said membrane is selected from a group consisting of ultra-filtration membranes (UF) that separate residual colloidal solids including clay and silt, organic matter including polymers and oils, tri-halomethanes (THM), algae and microbial contaminants.

17. The membrane process in accordance with claim 11, 12, 13 or 14 wherein said membrane is selected from a group consisting of nano-filtration membranes (NF) that separate residual colloidal solids, microbial contaminants, colour due to decaying organic vegetation, tri-halomethanes (THM) and water hardness.

18. The membrane process in accordance with claim 11, 12, 13 or 14 wherein said membrane is selected from a group consisting of reverse osmosis membranes (RO) that separate residual colloidal solids, microbial contaminants, colour, THM's, water hardness and soluble inorganic compounds.

19. The membrane process in accordance with claim 18 wherein a scale inhibitor is added to said pre-treated water in order to prevent scale formation and enable higher permeate recoveries to be obtained from said RO membranes.

20. The membrane process in accordance with claim 18 wherein acid is added to lower the pH of said pre-treated water in order to prevent calcium carbonate scale formation and enable higher permeate recoveries to be obtained from said RO membranes.

21. The membrane process in accordance with claim 17 wherein a scale inhibitor is added to said pre-treated water in order to prevent scale formation and enable higher permeate recoveries to be obtained from said NF membranes.

22. The membrane process in accordance with claim 21 or 19 wherein said scale inhibitor is selected from a group consisting of polyacrylates, sodium hexametaphosphate, EDTA and a combination thereof.

23. The membrane process in accordance with claim 17 wherein acid is added to lower the pH of said pre-treated water in order to prevent calcium carbonate scale formation and enable higher permeate recoveries to be obtained from said NF membranes.

24. The membrane process in accordance with claim 23 or 20 wherein said acid is selected from a group of inorganic and organic acids consisting of hydrochloric acid, sulfuric acid, phosphoric acid, acetic acid, citric acid, lactic acid and a combination thereof.

25. The membrane process in accordance with claim 1 wherein disinfection of said drinking water is achieved by adding chlorine and maintaining a residual free chlorine concentration of 0.5–1.0 mg/l in said drinking water.

26. The membrane process in accordance with claim 1 wherein disinfection of said drinking water is achieved by circulating said drinking water contained in a Drinking Water Storage Tank through a series of ultraviolet radiation lamps.

27. An enhanced membrane process for the economical treatment and purification of ground water containing colloidal suspended solids, natural organic matter (NOM) and biological contaminants, soluble iron and manganese oxides and hydroxides, hardness and total dissolved solids (TDS), which separates contaminants and produces safe drinking water while eliminating irreversible chemical fouling of the membrane surface, comprising:

a) Contacting said ground water with air and hydrogen peroxide over a packing contained inside a Packed Column Aerator in order to completely oxidize and precipitate the iron and manganese oxides and hydroxides and produce aerated ground water;

b) Adding a multi-valent metal coagulant and a cationic flocculant and mixing the chemicals in said aerated ground water to produce a pre-conditioned ground water with a stable floc containing all the colloidal suspended solids, iron and manganese oxides and hydroxides, natural organic matter (NOM) and biological contaminants;

c) Filtration of said pre-conditioned ground water using a multi-media filter (MMF) bed to separate the flocculated solids and provide pre-filtered water which contains a slight excess of the flocculating catonic flocculant which comprises a polymer and a positive charged associated with said cationic polymer and residual unfiltered particles;

d) Neutralization and reversal of the excess positive charge in said pre-filtered water to produce a slightly negatively charged pre-filtered water;

e) Fine Filtration of said slightly negatively charged pre-filtered water using a filter selected from a group consisting of woven fabric depth filters, bag filters, membrane cartridge filters and combinations thereof and having a nominal pore size equal to or less than 5

μm, producing pre-treated water having a Silt Density Index (SDI)<5;

f) Addition of a scale inhibitor to said pre-treated water in order to prevent scale formation and enable higher permeate recoveries to be obtained;

g) Addition of acid to said pre-treated water in order to lower the pH, prevent calcium carbonate scale formation and enable higher permeate recoveries to be obtained;

h) Pressurizing and introducing said pre-treated water into the high pressure side of a membrane system to produce a purified membrane permeate as drinking water on the low pressure side of said membrane system which is free from colloidal and microbial contaminants, and low in iron and hardness, and a membrane concentrate on the high pressure side of said membrane system which contains all residual contaminants and to discharge said membrane concentrate safely to receiving waters or to sanitary sewers; and i) Disinfection of said drinking water before distribution.

28. The enhanced membrane process in accordance with claim 27 wherein the Packed Column Aerator comprises a counter-current flow system with said ground water distributed over the top of the column packing, air is supplied from the bottom via a blower and flowing upwards through said column packing which is selected from a group of random packings consisting of Pall Rings, Intalox Saddles, Levapak, Super Levapak and combinations thereof.

29. The enhanced membrane process in accordance with claim 27 wherein a solution of hydrogen peroxide of 5–10% strength is injected into said ground water at the top of said packed column aerator in order to further enhance the oxidation efficiency of said iron and manganese oxides and hydroxides.

30. The enhanced membrane process in accordance with claim 27 wherein neutralization and reversal of said excess positive charge of said pre-filtered water is achieved by using an in-line high voltage capacitor to produce a continuous electrostatic field and impart a negative "zeta potential" into said pre-filtered water and onto any particles escaping said MMF bed.

31. The enhanced membrane process in accordance with claim 27 wherein neutralization and reversal of said excess positive charge of said pre-filtered water is achieved by using a cation exchange resin selected from a group consisting of strong acid cation exchange resins in the sodium form, weak acid cation exchange resins and combinations thereof.

32. The enhanced membrane process in accordance with claim 27 wherein neutralization and reversal of said excess positive charge is achieved by adding to said pre-filtered water a small concentration, in the range 5–20 mg/l, of a polymeric electrolyte selected from a group of compounds known as anionic surfactants consisting of poly-alkoxy carboxylates, poly-acrylates, alkylbenzene sulfonates and combinations thereof.

33. The enhanced membrane process in accordance with claim 27 wherein neutralization and reversal of said excess positive charge is achieved by the addition of an alkali solution selected from a group consisting of sodium hydroxide, sodium carbonate, lime and combinations thereof.

34. The enhanced membrane process in accordance with claim 27 wherein the membrane elements used to purify said pre-treated water are selected from a group of nano-filtration membranes (NF) consisting of spirally-wound, hollow fiber, tubular, disc-tube, plate and frame membrane elements and combinations thereof that separate residual solids, hardness, iron, manganese, microbial contaminants, colour due to decaying organic vegetation and THM.

35. The enhanced membrane process in accordance with claim 27 wherein the membrane elements used to purify said pre-treated water are selected from a group of reverse osmosis membranes (RO) consisting of spirally-wound, hollow fiber, tubular, disc-tube, plate and frame membrane elements and combinations thereof that separate residual solids, hardness, iron, manganese, microbial contaminants, colour due to decaying organic vegetation, THM and soluble inorganic compounds.

36. The enhanced membrane process in accordance with claim 27 wherein disinfection of said drinking water is achieved by adding chlorine and maintaining a residual free chlorine concentration of 0.5–1.0 mg/l in said drinking water.

37. The enhanced membrane process in accordance with claim 27 wherein disinfection of said drinking water is achieved by circulating said drinking water contained in a Drinking Water Storage Tank through a series of ultraviolet radiation lamps.

38. A further enhanced membrane process for the economical treatment and purification of industrial effluent wastewater containing colloidal, suspended solids, soluble organic compounds, natural organic matter (NOM) and biological contaminants, soluble iron and manganese oxides and hydroxides hardness and total dissolved solids (TDS), which separates contaminants and produces water suitable for recycle or discharge while eliminating irreversible chemical fouling of the membrane surface, comprising:

a) Adjusting the pH of said wastewater by adding an alkali solution in order to destabilize any iron complexes;

b) Contacting said wastewater with air and hydrogen peroxide over a packing contained inside a Packed Column Aerator in order to completely oxidize and precipitate the iron and manganese oxides and hydroxides and produce aerated wastewater;

c) Adding a multi-valent metal coagulant and a cationic flocculant and mixing the chemicals in said aerated wastewater to produce a pre-conditioned wastewater with a stable floc containing all the colloidal suspended solids, iron and manganese oxides and hydroxides and biological contaminants;

d) Clarification of said floc using a solid disengagement device selected from a group of clarifiers consisting of inclined plate lamella clarifiers, circular clarifiers, gravity settling tanks and combinations thereof to produce a clarifier supernatant containing a much lower concentration of floc;

e) Filtration of said clarifier supernatant floc using a multi-media filter (MMF) bed to separate entrained flocculated solids and provide pre-filtered water which contains a slight excess of the flocculating cationic flocculant which comprises a polymer and a positive charge associated with said cationic polymer and residual unfiltered particles;

f) Neutralization and reversal of the excess positive charge in said pre-filtered water to produce a slightly negatively charged pre-filtered water;

g) Fine Filtration of said slightly negatively charged pre-filtered water using a filter selected from a group consisting of woven fabric depth filters, bag filters, membrane cartridge filters and combinations thereof and having a nominal pore size equal to or less than 5 μm, producing pre-treated water having a Silt Density Index (SDI)<5;

h) Addition of a scale inhibitor to said pre-treated water in order to prevent scale formation and enable higher permeate recoveries to be obtained;

i) Addition of acid to said pre-treated water in order to lower the pH, prevent calcium carbonate scale formation and enable higher permeate recoveries to be obtained;

j) Pressurizing and introducing said pre-treated water into the high pressure side of a membrane system to produce a purified membrane permeate on the low pressure side of said membrane system which is free from colloidal and microbial contaminants, and low in iron, hardness and soluble organic and inorganic compounds and can be recycled, and a membrane concentrate on the high pressure side of said membrane system which contains all residual contaminants which must be treated further and/or sent to safe disposal; and k) Disinfection of said membrane permeate before recycle.

39. The further enhanced membrane process in accordance with claim 38 wherein the pH of said wastewater is adjusted to the range 9–11.

40. The further enhanced membrane process in accordance with claim 38 wherein said alkali solution is selected from a group consisting of sodium hydroxide, sodium carbonate, lime and combinations thereof.

41. The further enhanced membrane process in accordance with claim 38 wherein said Packed Column Aerator comprises a counter-current flow system with said wastewater distributed over the top of the column packing, air is supplied from the bottom via a blower and flowing upwards through said column packing which is selected from a group of random packings consisting of Pall Rings, Intalox Saddles, Levapak, Super Levapak and combinations thereof.

42. The further enhanced membrane process in accordance with claim 38 wherein a solution of hydrogen peroxide of 5–10% strength is injected into said wastewater at the top of said packed column aerator in order to further enhance the oxidation efficiency of said iron and manganese oxides and hydroxides.

43. The further enhanced membrane process in accordance with claim 38 wherein neutralization and reversal of said excess positive charge of said pre-filtered water is achieved by using an in-line high voltage capacitor to produce a continuous electrostatic field and impart a negative "zeta potential" into said pre-filtered water and onto any particles escaping said MMF bed.

44. The further enhanced membrane process in accordance with claim 38 wherein neutralization and reversal of said excess positive charge of said pre-filtered water is achieved by using a cation exchange resin selected from a group consisting of strong acid cation exchange resins in the sodium form, weak acid cation exchange resins and combinations thereof.

45. The further enhanced membrane process in accordance with claim 38 wherein neutralization and reversal of said excess positive charge is achieved by adding to said pre-filtered water a small concentration, in the range 5–20 mg/l, of a polymeric electrolyte selected from a group of compounds known as anionic surfactants consisting of poly-alkoxy carboxylates, poly-acrylates, alkylbenzene sulfonates and combinations thereof.

46. The further enhanced membrane process in accordance with claim 38 wherein the membrane elements used to purify said pre-treated water are selected from a group of nano-filtration membranes (NF) consisting of spirally-wound, hollow fiber, tubular, disc-tube, plate and frame membrane elements and combinations thereof that separate residual solids, hardness, iron and microbial contaminants and reduce the concentration of soluble organic and inorganic compounds.

47. The further enhanced membrane process in accordance with claim 38 wherein the membrane elements used to purify said pre-treated water are selected from a group of reverse osmosis membranes (RO) consisting of spirally-wound, hollow fiber, tubular, disc-tube, plate and frame membrane elements and combinations thereof that separate residual solids, hardness, iron, microbial contaminants and soluble organic and inorganic compounds.

48. The further enhanced membrane process in accordance with claim 38 wherein disinfection of said membrane permeate is achieved by adding chlorine and maintaining a residual free chlorine concentration of 0.5–1.0 mg/l in said membrane permeate.

49. The further enhanced membrane process in accordance with claim 38 wherein disinfection of said membrane permeate is achieved by circulating said permeate contained in a Recycle Water Storage Tank through a series of ultra-violet radiation lamps.

* * * * *